(12) United States Patent
Chiu et al.

(10) Patent No.: US 12,123,909 B2
(45) Date of Patent: Oct. 22, 2024

(54) ARRAY OF UNIT CELLS HAVING PAD STRUCTURES

(71) Applicant: Taiwan Semiconductor Manufacturing Co., Ltd., Hsinchu (TW)

(72) Inventors: Yu-Ching Chiu, Hsinchu (TW); Chih-Feng Ku, Hsinchu (TW); Chih-Kuang Kao, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 99 days.

(21) Appl. No.: 17/719,557

(22) Filed: Apr. 13, 2022

(65) Prior Publication Data

US 2023/0333158 A1   Oct. 19, 2023

(51) Int. Cl.
*G01R 31/317* (2006.01)
*G01R 31/3185* (2006.01)
*G06F 30/392* (2020.01)
*G06F 119/02* (2020.01)

(52) U.S. Cl.
CPC ............. *G01R 31/31717* (2013.01); *G01R 31/318533* (2013.01); *G06F 30/392* (2020.01); *G06F 2119/02* (2020.01)

(58) Field of Classification Search
CPC ............. G01R 31/31717; G01R 31/00; G01R 31/318533; G06F 30/392; G06F 2119/02
See application file for complete search history.

(56) References Cited

U.S. PATENT DOCUMENTS

| | | | |
|---|---|---|---|
| 2017/0212167 A1* | 7/2017 | Wu | ............ G01R 1/0416 |
| 2021/0125883 A1* | 4/2021 | Lin | ............ H01L 22/32 |
| 2022/0384279 A1* | 12/2022 | Lin | ............ H01L 23/528 |

* cited by examiner

*Primary Examiner* — Jermele M Hollington
*Assistant Examiner* — Taqi R Nasir
(74) *Attorney, Agent, or Firm* — Sterne, Kessler, Goldstein & Fox P.L.L.C.

(57) ABSTRACT

The present disclosure describes a method that includes scanning a circuit layout and identifying layout regions of the circuit layout. The method further includes placing unit cells in a layout region of the layout regions and forming a micro pad structure at a border of a unit cell of the unit cells. The micro pad structure includes interconnect structures that are electrically connected to the unit cell.

20 Claims, 7 Drawing Sheets

ARRAY OF UNIT CELLS HAVING PAD STRUCTURES

BACKGROUND

A three-dimensional integrated circuit ("3D IC") includes a semiconductor device with two or more layers of active electronic components integrated (e.g., vertically stacked and connected) on a substrate to form an integrated circuit. 3D IC technologies include die-on-die stacking, die-on-wafer stacking, and wafer-on-wafer stacking. It's increasingly challenging to identify faulty circuit components of 3D IC structures.

BRIEF DESCRIPTION OF THE DRAWINGS

Aspects of the present disclosure are best understood from the following detailed description when read with the accompanying figures. It is noted that, in accordance with common practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed that are between the first and second features, such that the first and second features are not in direct contact. In addition, the present disclosure may repeat reference numerals and/or letters in the various examples. This repetition does not in itself dictate a relationship between the various embodiments and/or configurations discussed.

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "nominal" as used herein refers to a desired, or target, value of a characteristic or parameter for a component or a process operation, set during the design phase of a product or a process, together with a range of values above and/or below the desired value. The range of values can be due to slight variations in manufacturing processes or tolerances.

The term "vertical," as used herein, means nominally perpendicular to the surface of a substrate.

In some embodiments, the terms "about" and "substantially" can indicate a value of a given quantity that varies within 20% of the value (e.g., +1%, ±2%, ±3%, ±4%, 5%, ±10%, ±20% of the value). These values are merely examples and are not intended to be limiting. The terms "about" and "substantially" can refer to a percentage of the values as interpreted by those skilled in relevant art(s) in light of the teachings herein.

An integrated circuit ("IC") structure can include a compilation of layers with different functionality, such as interconnects, power distribution network, logic chips, memory chips, radio frequency (RF) chips, and the like. A three-dimensional (3D) integrated circuit ("3D IC") structure is a non-monolithic vertical structure developed based on the IC structure and can include, for example, a two-dimensional (2D) chip flipped and stacked on a front surface of a carrier chip through various bonding techniques, such as hybrid bonding. In 3D IC structures, each of the layers can be interconnected by micro-bumps, through silicon vias (TSVs), hybrid bonding, other types of interconnect structures, or combinations thereof.

IC structures are subject to variations in the process that can result in latent fabrication defects being formed in the electrical components of the 3D IC structures. When fabrication conditions in the processing chamber deviate from the ideal conditions, abnormalities can be introduced in the physical structure of the electrical components that manifest as faults in the operation of the IC structures. A fault detection system can be used to detect faults of IC structures and provide real-time results on fabrication yield or operation status of semiconductor devices in the IC structures. An exemplary fault detection system includes probes that are electrically connected to external terminals of IC structures, such as conductive pads, and analyzing units that sends, receives, and process testing signals. Testing signals are sent into the IC structure by the fault detection system and return signals are analyzed to identify faulty components of the IC structure. The duration between when a testing signal is sent and when it is analyzed should be under an assigned timing budget for fault detection. However, timing budgets have to be significantly increased as IC structures become more complex.

Various embodiments described in the present disclosure are directed to the placement and routing of unit cells with micro pad structures, according to some embodiments. In some embodiments, an automatic placement and routing (APR) tool can be configured to scan circuit layouts of an IC structure and identify areas of the circuit layouts that are suitable for implementing unit cells. The identified areas can include interconnect layers, vias, active devices, or passive devices. Each unit cell can include one or more standard cells of a circuit layout and have programmable design parameters. In some embodiments, the APR tool can group and place unit cells into arrays, where each unit cell of an array of unit cells can have similar functional or circuit designs. In some embodiments, the APR tool can group and place unit cells having different functionality or designs. Each unit cell can also include at least one micro pad structure for electrically connecting the unit cell to other adjacent unit cells or to external circuitry. In some embodiments, the micro pad structures can include interconnect structures, such as conductive lines and vias. Adjacent unit cells can be connected by electrically connecting the respective micro pad structures of the adjacent unit cells. In some embodiments, each unit cell can be connected to at least two or more other unit cells. A testing scheme for identifying faulty components, such as faulty metal lines and vias of interconnect structures, can include a first probing process of sending testing signals through a series of unit cells and identifying a faulty unit cell of the series of unit cells by analyzing the received signals and/or determined circuit parameters. A second probing process can include applying testing signals to the identified faulty unit cell and identifying faulty metal conductive lines and/or vias by analyzing the received signals and/or determined circuit parameters of the faulty unit cell. Benefits of implementing arrays of unit cells having micro pad structures can include improved efficiency of identifying faulty components of an IC structure, which in turn lowers circuit fabrication cost.

Figure 1A:
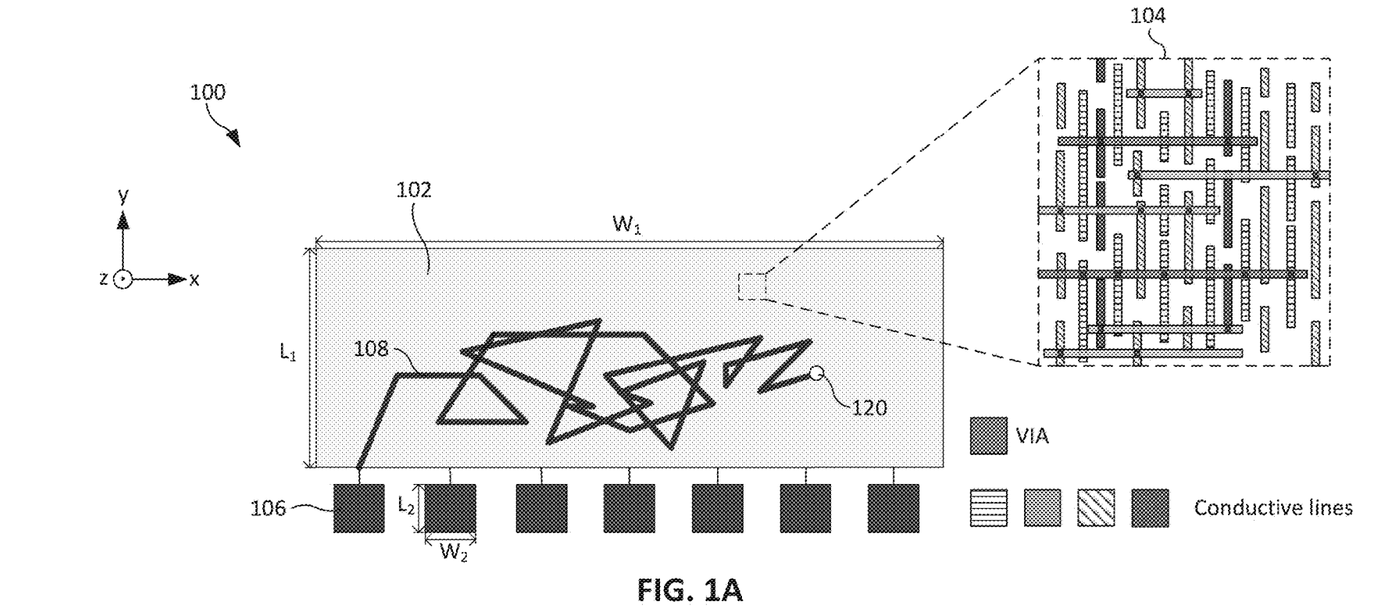
FIG. 1A is a schematic illustration of an integrated circuit layout incorporating macro pad structures, according to some embodiments.

FIG. 1A is a schematic illustration of an IC layout, according to some embodiments. IC layout 100 can include a layout area 102 and macro pad structures 106 connected to layout area 102. IC layout 100 can further include other suitable structures and are not illustrated in FIG. 1 for simplicity. Components in IC layout 100 are for illustration purposes and are not drawn to scale.

Layout area 102 can include suitable circuitry components, such as interconnect structures and passive/active devices (e.g., capacitors, inductors, and/or transistors) arranged to be CMOS circuits, RF circuitry, logic circuits, peripheral circuitry, and the like. In some embodiments, layout area 102 can include the placement of fin field-effect transistors (finFETs) with gate terminals and source/drain terminals. In some embodiments, layout area 102 can include the placement of planar transistor devices. In some embodiments, the circuit components can be arranged as standard cells and placed in layout area 102. Standard cells can be used as base elements for building integrated circuits. The standard cells are placed in layout area 102 and routed to form functional circuits.

Layout area 102 can include device and structures that are formed in "a front-end-of-line (FEOL)" region, "a middle-end-of-line (MEOL)" region, and "a back-end-of-line (BEOL)" region of a semiconductor device. Enlarged view 104 of layout area 102 illustrates interconnect structures are formed in the BEOL region and include various intersecting conductive lines. The conductive lines are connected by vias that are formed at the intersection of the conductive lines. In some embodiments, conductive lines can be metal lines that are formed at different metal levels, such as different metal levels of a BEOL interconnect structure where a metal level is formed above another metal level. For example, a first metallization layer M1 is formed under a second metallization layer M2, the second metallization layer M2 is formed under a third metallization layer M3, and so on and so forth. Conductive lines from a metallization layer can be electrically connected to other conductive lines from another metallization layer through vias that are formed between the metallization layers. In some embodiments, layout area 102 can have any suitable width $W_1$ and length $L_1$. For example, width $W_1$ can be between about 400 μm and about 800 μm, between about 500 μm and about 700 μm, between about 550 μm and about 650 μm, or any suitable dimensions. In some embodiments, length $L_1$ can be between about 200 μm and about 400 μm, between about 250 μm and about 350 μm, between about 275 μm and about 325 μm, or any suitable dimensions.

Macro pad structures 106 are conductive pads that are electrically coupled to devices and structures within layout area 102. For example, macro pad structures 106 can be electrically coupled to the conductive lines as illustrated in enlarged view 104. In some embodiments, macro pad structures 106 are electrically coupled to the passive/active devices placed within layout area 102. In some embodiments, macro pad structures 106 are formed using a single continuous sheet of conductive material that extend substantially in the horizontal directions (e.g., x and y directions). In some embodiments, macro pad structures 106 can have any suitable width $W_2$ and length $L_2$. For example, width $W_2$ can be between about 20 μm and about 80 μm, between about 15 μm and about 90 μm, between about 10 μm and about 100 μm, or any suitable dimensions. In some embodiments, length $L_2$ can be between about 20 μm and about 80 μm, between about 15 μm and about 90 μm, between about 10 μm and about 100 μm, or any suitable dimensions.

Figure 1B:
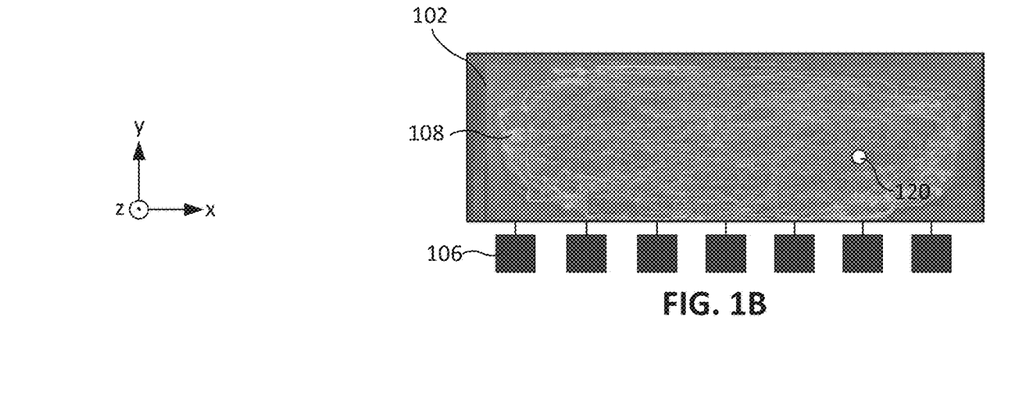
FIG. 1B is a simulated illustration of an integrated circuit layout, according to some embodiments.

Performing fault detection to identify faulty conductive lines or vias of structures within layout area 102 includes applying a testing signal through at least one of macro pad structures 106 and analyzing the received signal. For example, a circuit resistance capacitance (RC) constant can be determined by applying an electric signal through macro pad structure 106. A leakage current can also be determined by applying an electric signal through macro pad structure 106. The electric testing signal travels a signal path 108 until it reaches location 120, where a faulty conductor or a faulty via is located. Signal path 108 illustrated in FIG. 1A follows a disorderly path because conductive lines placed in layout area 102 may extend throughout layout area 102. For example, signal path 108 may travel throughout the majority of regions in layout area 102 before encountering location 120 where a faulty component is located. FIG. 1B is a simulated illustration of layout area 102 after a testing signal is applied and travelled along signal path 108 (shown in light white lines) before encountering location 120 where a faulty component is located. As circuits become more complex, it is increasingly time consuming and challenging for identifying faulty structures.

Figure 2:
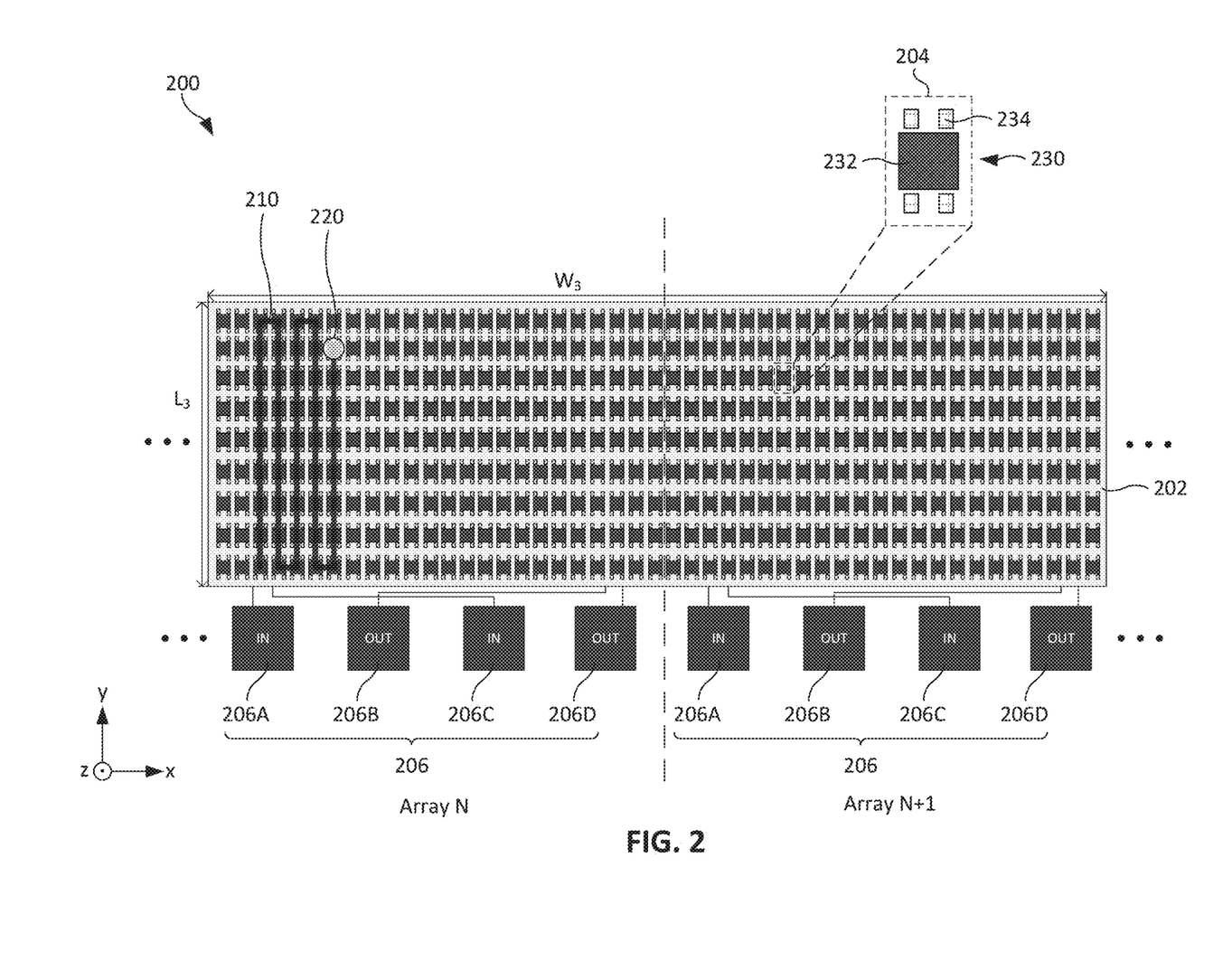
FIG. 2 is a schematic illustration of an integrated circuit layout incorporating arrays of unit cells having micro pad structures, according to some embodiments.

FIG. 2 is a schematic illustration of an IC layout with unit cells and micro pad structures, according to some embodiments. IC layout 200 can include a layout area 202 that includes arrays of unit cells 230, such as an array N and an adjacent array N+1. Unit cell 230 can include an active region 232 and micro pad structures 234. Macro pad structures 206 can be similar to macro pad structures 106 illustrated in FIG. 1. For example, macro pad structures 206 can be connected to layout area 202. IC layout 200 can further include other suitable structures and are not illustrated in FIG. 2 for simplicity. Components in IC layout 200 are for illustration purposes and are not drawn to scale.

Layout area 202 can be similar to layout area 102 illustrated in FIG. 1. For example, Layout area 202 can also include interconnect structures and passive and/or active devices. In some embodiments, layout area 202 can have any suitable width $W_3$ and length $L_3$. For example, width $W_3$ can be between about 200 µm and about 300 µm, between about 220 µm and about 280 µm, between about 240 µm and about 260 µm, or any suitable dimensions. In some embodiments, length $L_3$ can be between about 100 µm and about 200 µm, between about 120 µm and about 180 µm, between about 140 µm and about 160 µm, or any suitable dimensions.

FIG. 2 illustrates two arrays of unit cell 230: array N and array N+1. Additional arrays can be included in IC layout 200 and are not illustrated in FIG. 2 for simplicity. Each array includes unit cells 230 arranged in rows and columns as well as macro pad structures 206 electrically coupled to structures in layout area 202. Each unit cell 230 includes an active region 232 and one or more micro pad structures 234. Enlarged view 204 illustrates a unit cell 230 with four micro pad structures 234: two positioned along a top border of active region 232 and two positioned along a bottom border of active region 232. Additional or fewer number of micro pad structures can be included in each unit cell 230 and are within the scope of the present disclosure. In some embodiments, each unit cell 230 within an array can realize similar or different circuit functions.

Performing fault detection to identify faulty conductive lines or vias of structures within layout area 202 can provide various benefits. First, devices and structures of layout area 202 are divided into arrays, where each array of the array of unit cells can include at least two macro pad structures. Dividing layouts into smaller regions compared to a single region covering the entire layout area can improve fault detecting efficiency. For example, testing can be applied simultaneously and in parallel between different arrays. For example, each array illustrated in IC layout 200 of FIG. 2 includes two pairs of macro pad structures 206 where each pair of macro pad structures 206 includes an IN terminal for applying a testing signal and an OUT terminal for receiving the testing signal. In some embodiments, a voltage bias can be applied to the array of unit cells 230 through the IN and OUT terminals of macro pad structures 206.

Unit cells 230 can be electrically connected to each other through adjacent micro pad structures 234. For example, a unit cell 230 from a row can be electrically connected to a unit cell 230 from another row that is immediately below or above. In other words, unit cells 230 from the same column are electrically connected to each other. In addition, unit cells 230 located at a top or bottom of a column are also connected to an adjacent unit cell 230 in the same row. As a result, when a testing signal is applied through one of the IN terminals of macro pad structure 206, a signal path 210 of the testing signal is pre-determined and predictable. For example, signal path 210 extends substantially in a first horizontal direction (e.g., along the y direction) through columns of unit cells 230 and then in a second horizontal direction (e.g., along the x direction) when the path reaches a top or bottom row of unit cells 230 within the array of unit cells 230. As shown in FIG. 2, signal path 210 approaches location 220 at which a unit cell 230 having a faulty conductive line or a faulty via is located. In contrast to signal path 108 illustrated in FIGS. 1A and 1B, signal path 210 is more compact. For example, signal path 210 only extends along a much small portion of the width of layout area 202. In addition, signal path 210 can be pre-determined and predictable compared to signal path 108 since signal path 210 only extends along electrically connected unit cells 230.

Figure 3:
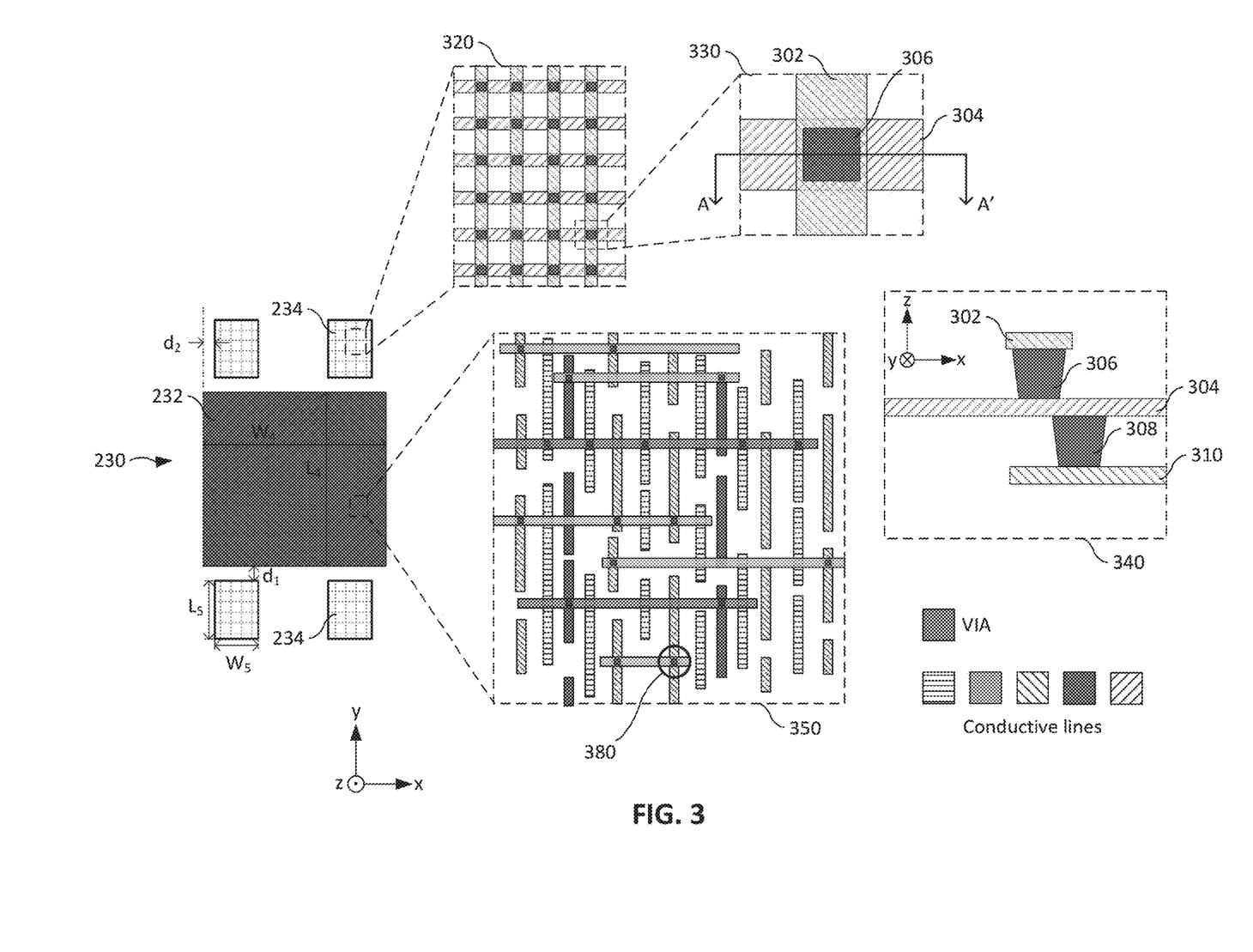
FIG. 3 is a schematic illustration of a unit cell having micro pad structures, according to some embodiments.

FIG. 3 illustrates a unit cell and its components, according to some embodiments. An example of unit cell can be unit cell 230 illustrated in FIG. 2. In some embodiments, unit cell 230 can include micro pad structures 234 formed along a top border of active region 232 and along a bottom border of active region 232. In some embodiments, micro pad structures 234 can be formed along other borders of active region 232, such as left or right borders that extend along the y direction. In some embodiments, the number of micro pad structures 234 formed along a first border (e.g., a top border) can be different from the number of micro pad structures 234 formed along a second border (e.g., a bottom border). In some embodiments, micro pad structures 234 can be formed along more than two borders of active region 232. For example, micro pad structures 234 can be formed along top and bottom borders as well as left and right borders of active region 232. Each micro pad structure 234 is electrically coupled to active region 232.

Active regions 232 can include interconnect structures and passive/active devices (e.g., capacitors, inductors, and/or transistors) arranged to be CMOS circuits, RF circuitry, logic circuits, peripheral circuitry, and the like. The interconnect structures can include conductive lines formed in various suitable metallization layers and vias formed between the metallization layers. In some embodiments, active region 232 can have a width $W_4$ that is between about 5 µm and about 50 µm, between about 10 µm and about 45 µm, between about 15 µm and about 40 µm, or any suitable dimensions. In some embodiments, active regions 232 can have a length $L_4$ that is between about 5 µm and about 50 µm, between about 10 µm and about 45 µm, between about 15 µm and about 40 µm, or any suitable dimensions.

Micro pad structures 234 can be different from macro pad structures 206 in several aspects. First, micro pad structures 234 can be formed using conductive lines and vias of an interconnect structure. As shown in enlarged views 320 and 330, micro pad structures 234 include conductive lines 302 and 304 as well as vias 306 formed at the intersection of the aforementioned conductive lines. Enlarged view 340 also shows portions of micro pad structures 234 through the A-A' plane of enlarged view 330. Enlarged view 340 illustrates that micro pad structures 234 also includes conductive lines formed in different metallization layers. For example, portions of conductive line 310 and vias 308 formed between conductive lines 304 and 310 are also formed within micro pad structure 234. In some embodiments, conductive lines 302, 304, and 310 are respectively formed in the M3, M2, and M1 metallization layers. In some embodiments, conductive lines 302, 304, and 310 can be formed in other suitable metallization layers, such as M4, M3, and M2, and the like. In some embodiments, widths of conductive lines 302, 304, and 310 can be between about 5 nm and about 100 nm, between about 10 nm and about 75 nm, between about 20 nm and about 50 nm, or any suitable dimensions. In some embodiments, widths and lengths of vias 306 and 308 can be between about 5 nm and about 100 nm, between about 10 nm and about 75 nm, between about 20 nm and about 50 nm, or any suitable dimensions. In contrast, macro pad structures 206 are formed using a single continuous sheet of conductive material in a single metallization layer.

Second, dimensions of micro pad structures 234 are orders of magnitude smaller than macro pad structures 206. For example, micro pad structures 234 can have a width $W_5$ that is between about 0.1 µm and about 1 µm, between about 0.08 µm and about 1.5 µm, between about 0.05 µm and about 2 µm, or any suitable dimensions. For example, micro pad structures 234 can have a length $L_5$ that is between about 0.1 µm and about 1 µm, between about 0.08 µm and about 1.5 µm, between about 0.05 µm and about 2 µm, or any suitable dimensions. In some embodiments, a ratio $W_4/W_5$ or $L_4/L_5$ can be between about 10 and about 100, between about 5 and about 500, between about 2 and about 1000, or any suitable ratios. In some embodiments, micro pad structures 234 can be placed away from active region 232 by a distance $d_1$. In some embodiments, distance $d_1$ can be between about 0.5 μm and about 2 μm, between about 0.75 μm and about 1.75 μm, between about 1 μm and about 1.5 μm, or any suitable dimensions. In some embodiments, micro pad structures 234 can be offset from a left or right boundary of active region 232 by a distance $d_2$. In some embodiments, distance $d_2$ can be between about 0.5 μm and about 2 μm, between about 0.75 μm and about 1.75 μm, between about 1 μm and about 1.5 μm, or any suitable dimensions.

Figure 4:
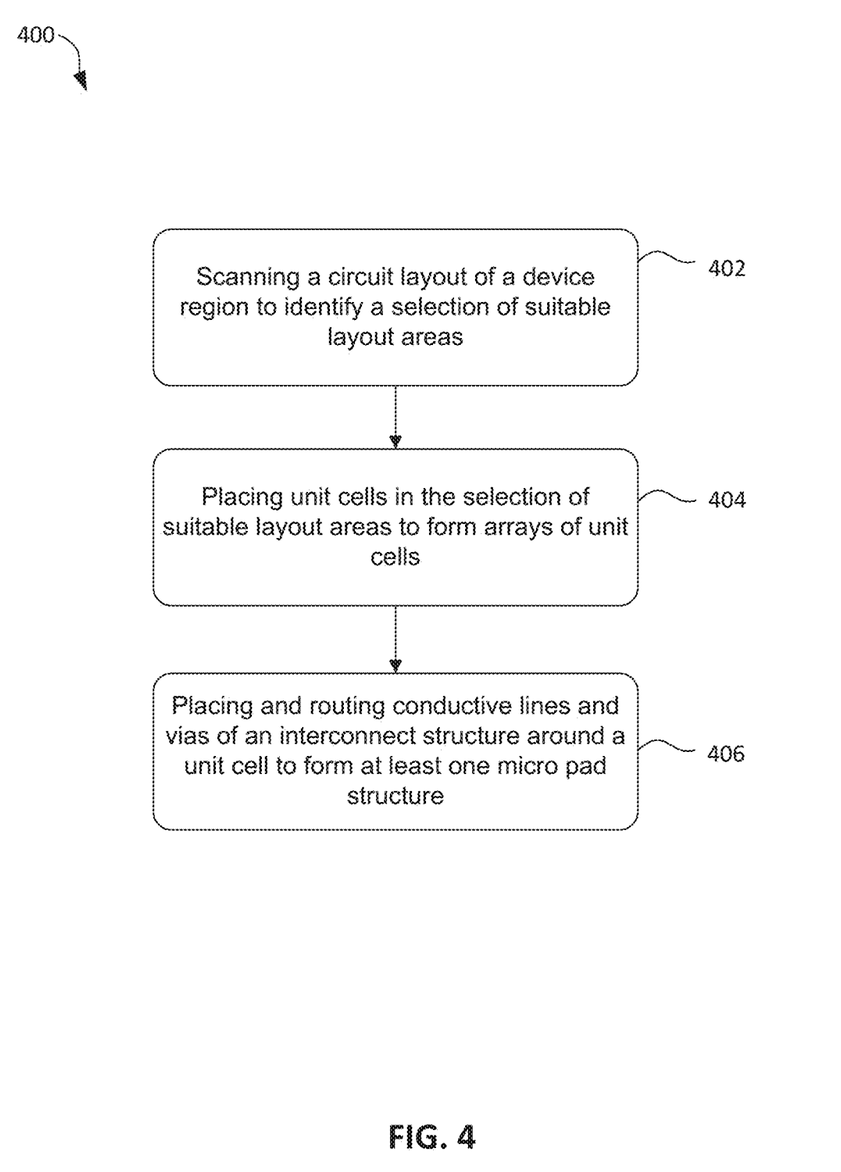
FIG. 4 is a flow diagram of a method for forming arrays of unit cells having micro pad structures, according to some embodiments.

FIG. 4 is a flow diagram of a method 400 for forming unit cells and micro pad structures in IC layouts, in accordance with some embodiments of the present disclosure. It should be noted that the operations of method 400 can be performed in a different order and/or vary, and method 400 may include more operations that are not described for simplicity. Although processes for forming unit cells and micro pad structures are described as examples, the formation process can be applied to various suitable semiconductor structures. The described formation processes are exemplary, and alternative processes in accordance with this disclosure may be performed that are not shown in the figures.

At operation 402, a circuit layout of a device region is scanned to determine a selection of suitable layout areas, according to some embodiments of the present disclosure. Referring to FIG. 2, layout area 202 can be scanned to determine regions of a circuit layout that are suitable for implementing unit cells and micro pad structures. In some embodiments, one or more rules can be used for selecting a region of the circuit layout. For example, an area that is greater than a threshold area can be selected for implementing unit cells and micro pad structures. In some embodiments, the threshold area can be about 2000 μm². For example, the threshold area can be between about 500 μm² and about 2500 μm², between about 1000 μm² and about 2000 μm², between about 1500 μm² and about 1800 μm², or any suitable value. In response to the area being greater than the threshold area, the area is selected as the suitable layout areas. In some embodiments, the selection rule can include layout areas serving a certain circuitry function. For example, circuit layout regions that contain certain functional units of interest, such as latches, switches, adders, comparators, amplifiers, etc. can be selected. In some embodiments, the selection rule can include selecting any region that has certain predetermined characteristics. For example, an area with higher susceptibility of containing faulty conductive lines and/or vias can be selected for implementing unit cells and micro pad structures. For example, the area selected can have a high probability (greater than about 1% of the total circuit elements) of having faulty conductive lines and/or vias.

An automatic routing and placement (APR) tool can be configured to scan layout area 202. Based on the aforementioned predetermined set of selection rules, the APR tool can be configured to identify and select a region of a circuit layout that satisfies the predetermined set of selection rules. In some embodiments, the set of selection rules can include identifying regions that have areas greater than a threshold area, have certain circuitry function, or have any suitable characteristics.

At operation 404, unit cells are placed in the selection of suitable layout areas to form arrays of unit cells, according to some embodiments of the present disclosure. An APR tool can be configured to place unit cells in the selection of suitable layout areas and in the form of rows and columns to form an array of unit cells. The APR tool can further form multiple arrays in the selection of suitable areas if needed. Referring to FIG. 2, the APR tool can be configured to place unit cells 230 in array N regions and array N+1 regions. The APR tool can be further configured to place macro pad structures, such as macro pad structures 206, in the array regions and electrically couple macro pad structures 206 to structures and devices in layout area 202.

At operation 406, at least one micro pad structure is placed around a unit cell by placing and routing conductive lines and vias of an interconnect structure, according to some embodiments of the present disclosure. Referring to FIG. 3, each micro pad structure 234 can include conductive lines formed in any suitable metallization layer and vias that electrically connect the conductive lines. In some embodiments, the conductive lines, such as conductive lines 302, 304, and 310, are electrically connected to suitable devices within active region 232 of unit cell 230. In some embodiments, additional micro pad structures can be positioned around active region 232 of unit cell 230.

Figure 5:
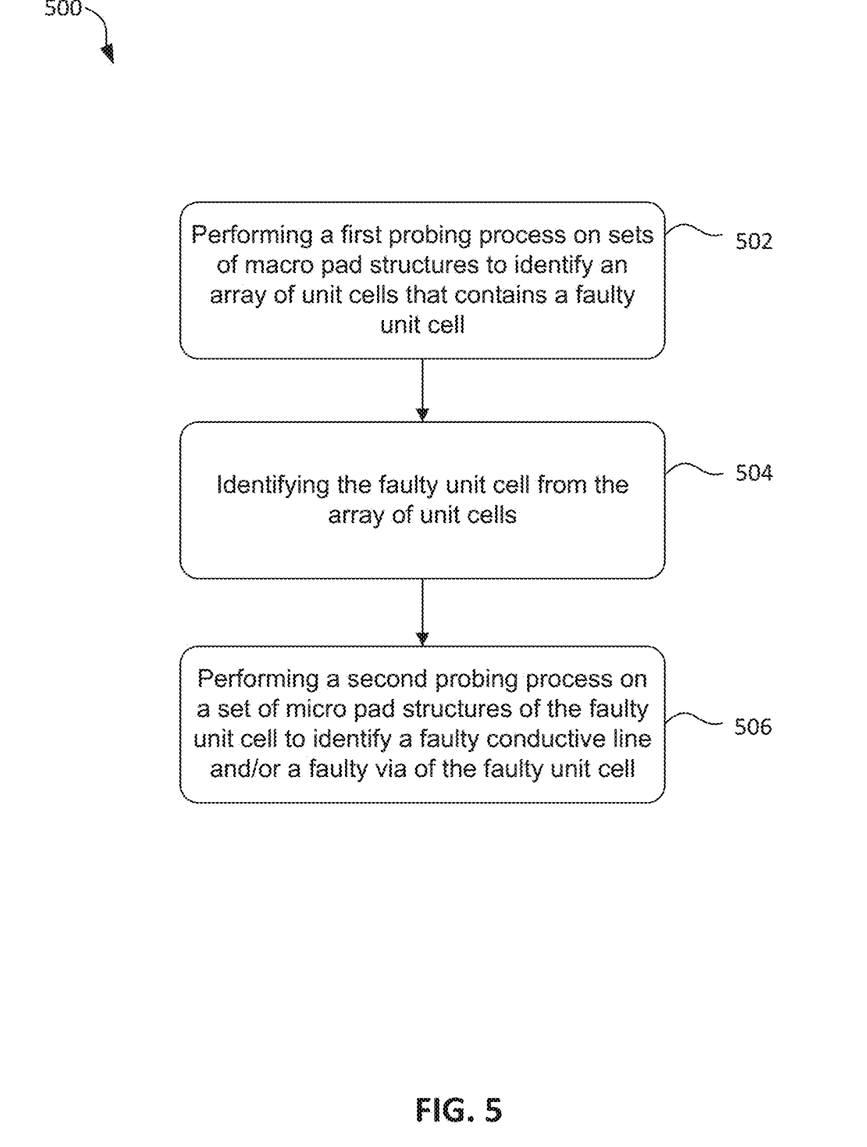
FIG. 5 is a flow diagram of a method for identifying faulty structures of an integrated circuit, according to some embodiments.

FIG. 5 is a flow diagram of a method 500 for identifying faulty components of a circuit layout incorporating unit cells and micro pad structures, in accordance with some embodiments of the present disclosure. It should be noted that the operations of method 500 can be performed in a different order and/or vary, and method 500 may include more operations that are not described for simplicity. Although processes for forming unit cells and micro pad structures are described as examples, the formation process can be applied to various suitable semiconductor structures. The described formation processes are exemplary, and alternative processes in accordance with this disclosure may be performed that are not shown in the figures.

At operation 502, a first probing process is performed on sets of macro pad structures to identify an array of unit cells that contains a faulty unit cell, according to some embodiments of the present disclosure. Referring to FIG. 2, the first probing process can apply testing signals to multiple arrays of unit cells, such as array N and array N+1, or any other suitable arrays, to determine if an array of unit cells contain any faulty unit cells. The first probing process can be performed simultaneously to multiple arrays of unit cells or performed on an array of unit cells at a time. In some embodiments, the first probing process can be applied to a first pair of macro pad structures 206 of an array which includes a first macro pad structure 206A being used as an input terminal and a second macro pad structure 206B being used as an output terminal. First macro pad structure 206A is connected to a voltage potential that is greater than a voltage potential that is connected to second macro pad structure 206B for determining an RC constant of a signal path of array N. Similarly, a first probing process can be applied to a second pair of macro pad structures 206 that includes macro pad structures 206C and 206D.

At operation 504, a faulty unit cell is identified from within the group of unit cells, according to some embodiments of the present disclosure. Referring to FIG. 2, a faulty unit cell 230 can be located at location 220 by analyzing testing signals that are applied to macro pad structures 206. The determination of location 220 can be based on any suitable methods, such as comparing a determined RC constant with a desired RC constant and determining the location of faulty unit cell 230 based on the difference between the RC constants. In some embodiments, the location of faulty unit cell 230 can be determined by comparing the location of faulty unit cell 230 with a wafer-level or a chip-level map.

At operation 506, a second probing process is performed on a set of micro pad structures of the identified faulty unit cell to identify faulty conductive lines and/or faulty vias, according to some embodiments of the present disclosure. Referring to FIG. 3, the second probing process can apply testing signals to micro pad structures 234 of unit cell 230, to identify the faulty conductive line and/or faulty vias of active region 232. In some embodiments, the faulty conductive line and/or faulty vias of active region 232 can be determined by performing a scanning electron microscopy (SEM) inspection. In some embodiments, the second probing process can be applied to a micro pad structure 234, such as one or more micro pad structures positioned at a top or bottom border of active region 232. In some embodiments, two micro pad structures can be used, in which a first micro pad structure is used as an input terminal and a second micro pad structure is used as an output terminal. In some embodiments, a first micro pad structure is connected to a voltage potential that is greater than a voltage potential that is connected to a second micro pad structure. As shown in FIG. 3, a faulty via is identified at location 380.

Figure 6:
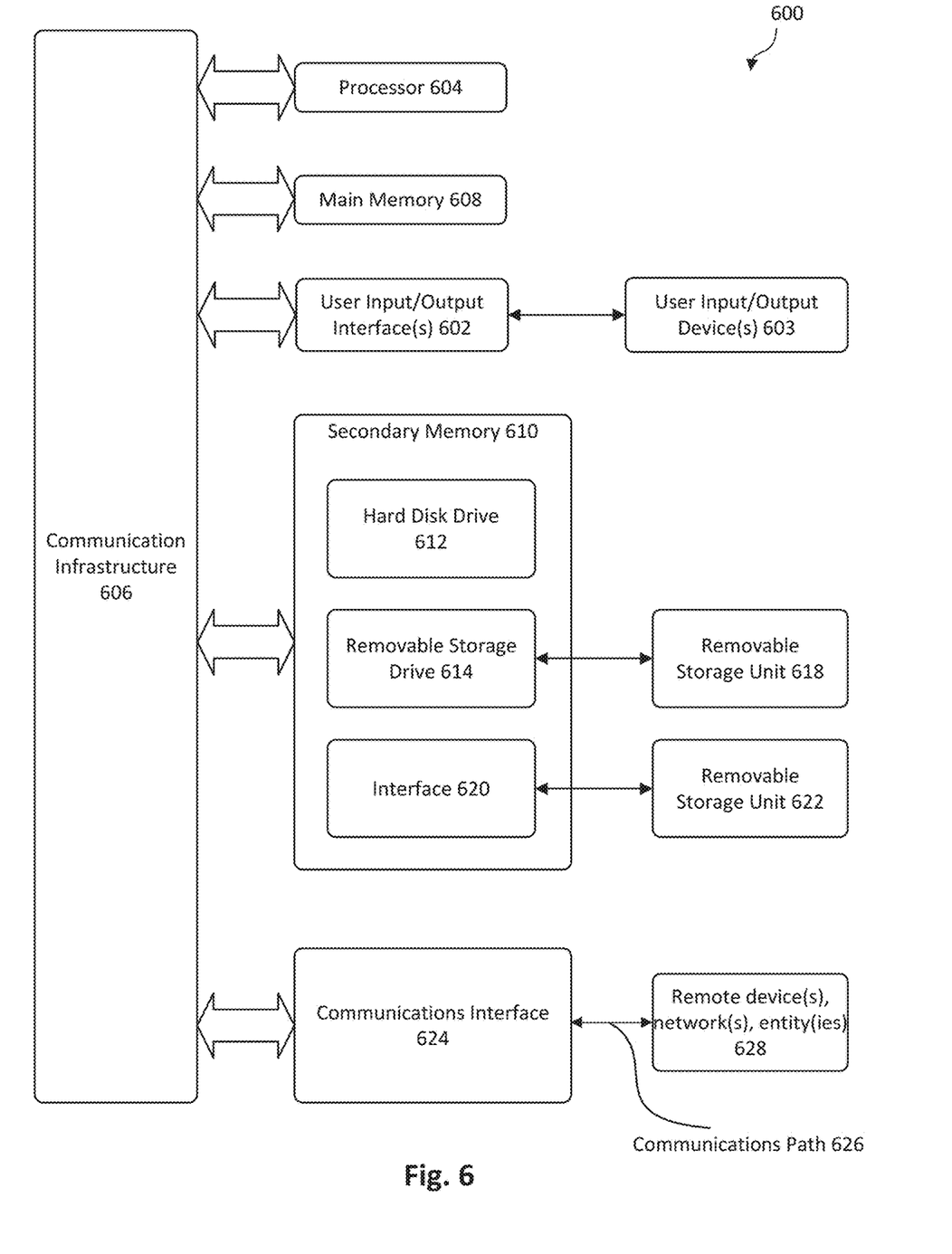
FIG. 6 is an illustration of an exemplary computer system for implementing various embodiments of the present disclosure, according to some embodiments.

FIG. 6 is an illustration of an example computer system 600 in which various embodiments of the present disclosure can be implemented, according to some embodiments. Computer system 600 can be any computer capable of performing the functions and operations described herein. For example, and without limitation, computer system 600 can be capable of scanning circuit layout areas, identifying a selection of circuit layout areas, placing and routing unit cells and micro pad structures, performing simulation tests, identifying faulty unit cells, and identifying faulty conductive lines and/or vias. In some embodiments, computer system 600 can be an EDA tool. Computer system 600 can be used, for example, to execute one or more operations in methods 400, 500, and 700, which describe exemplary methods for forming placing and routing unit cells and micro pad structures as well as identifying faulty unit cells and faulty conductive lines and vias within the faulty unit cells.

Computer system 600 includes one or more processors (also called central processing units, or CPUs), such as a processor 604. Processor 604 is connected to a communication infrastructure or bus 606. Computer system 600 also includes input/output device(s) 603, such as monitors, keyboards, pointing devices, etc., that communicate with communication infrastructure or bus 606 through input/output interface(s) 602. An EDA tool can receive instructions to implement functions and operations described herein—e.g., method 400 of FIG. 4, method 500 of FIG. 5, and method 700 of FIG. 7—via input/output device(s) 603. Computer system 600 also includes a main or primary memory 608, such as random access memory (RAM). Main memory 608 can include one or more levels of cache. Main memory 608 has stored therein control logic (e.g., computer software) and/or data. In some embodiments, the control logic (e.g., computer software) and/or data can include one or more of the operations described herein with respect to method 400 of FIG. 4, method 500 of FIG. 5, and method 700 of FIG. 7. For example, main memory 608 can include a non-transitory computer-readable medium having instructions stored thereon that, when executed by computer system 600, causes computer system 600 to perform operations, such as forming keep-out areas and placing and/or rerouting conductive lines.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, and/or any other computer data storage device. Removable storage drive 614 reads from and/or writes to removable storage unit 618 in a well-known manner.

According to some embodiments, secondary memory 610 can include other means, instrumentalities or other approaches for allowing computer programs and/or other instructions and/or data to be accessed by computer system 600. Such means, instrumentalities or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. In some embodiments, secondary memory 610, removable storage unit 618, and/or removable storage unit 622 can include one or more of the operations described herein with respect to method 400 of FIG. 4, method 500 of FIG. 5, and method 700 of FIG. 7.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

The operations in the preceding embodiments can be implemented in a wide variety of configurations and architectures. Therefore, some or all of the operations in the embodiments herein—e.g., method 400 of FIG. 4, method 500 of FIG. 5, and method 700 of FIG. 7 (described below)—can be performed in hardware, in software, or both. In some embodiments, a tangible apparatus or article of manufacture comprising a tangible computer useable or readable medium having control logic (software) stored thereon is also referred to herein as "a computer program product" or "a program storage device." This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein. In some embodiments, computer system 600 is installed with software to perform operations in the manufacturing of photomasks and circuits, as illustrated in method 700 of FIG. 7 (described below). In some embodiments, computer system 600 includes hardware/equipment for the manufacturing of photomasks and circuit fabrication. For example, the hardware/equipment can be connected to or be part of remote devices 628 (remote device(s), network(s), entity(ies)) of computer system 600.

Figure 7:
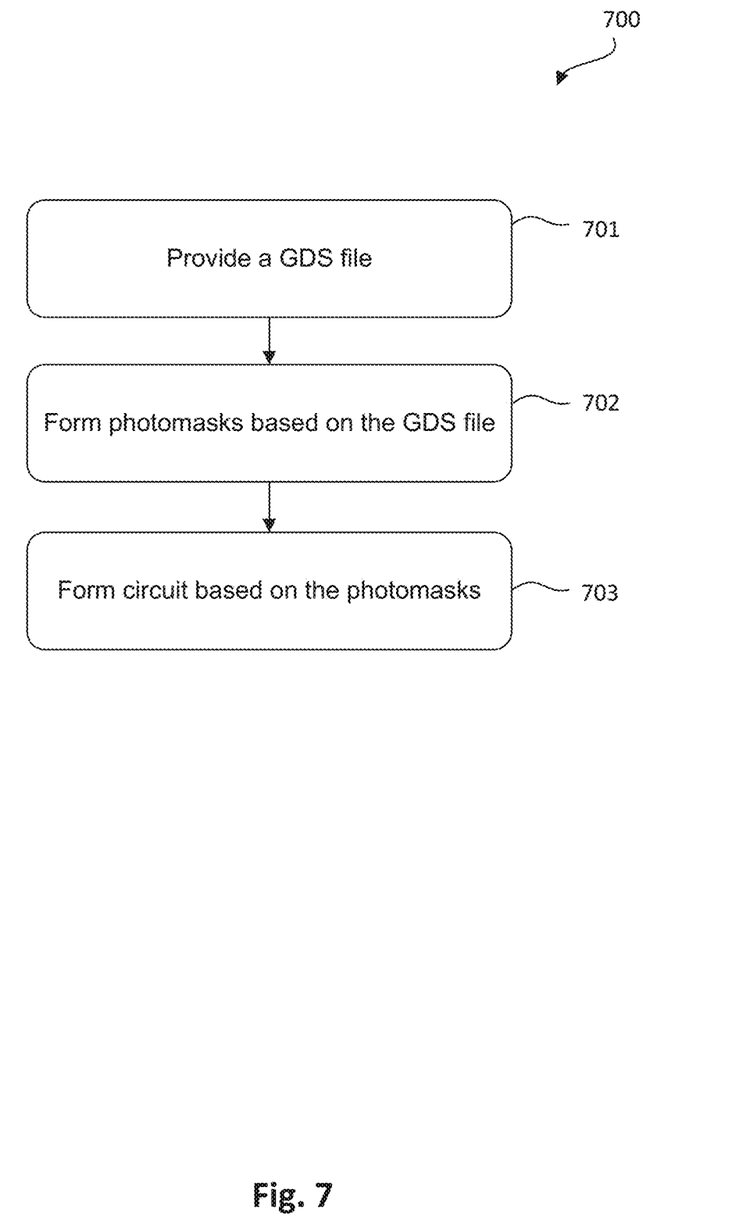
FIG. 7 is an illustration of a process to form standard cell structures and conductive line placement and routing based on a graphic database system (GDS) file, according to some embodiments.

FIG. 7 is an illustration of an exemplary method 700 for circuit fabrication, according to some embodiments. In some embodiments, operations/steps of method 700 can be performed in a different order. Variations of method 700 should also be within the scope of the present disclosure.

In operation 701, a GDS file is provided. The GDS file can be generated by an EDA tool and include standard cell structures optimized based on the present disclosure. The operation depicted in operation 701 can be performed by, for example, an EDA tool that operates on a computer system, such as computer system 600 described above.

In operation 702, photomasks are formed based on the GDS file. In some embodiments, the GDS file provided in operation 701 is taken to a tape-out operation to generate photomasks for fabricating one or more integrated circuits. In some embodiments, a circuit layout included in the GDS file can be read and transferred onto a quartz or glass substrate to form opaque patterns that correspond to the circuit layout. The opaque patterns can be made of, for example, chromium or other suitable metals. Operation 702 can be performed by a photomask manufacturer, where the circuit layout is read using a suitable software tool (e.g., an EDA tool) and the circuit layout is transferred onto a substrate using a suitable printing/deposition tool. The photomasks reflect the circuit layout/features included in the GDS file.

In operation 703, one or more circuits are formed based on the photomasks generated in operation 702. In some embodiments, the photomasks are used to form patterns/structures of the circuit contained in the GDS file. In some embodiments, various fabrication tools (e.g., photolithography equipment, deposition equipment, and etching equipment) are used to form features of the one or more circuits.

Various embodiments described in the present disclosure are directed to the placement and routing of unit cells with micro pad structures, according to some embodiments. In some embodiments, an APR tool can be configured to scan circuit layouts of an IC package and identify areas of circuit layouts that are suitable for implementing unit cells. Each unit cell can include one or more standard cells of a circuit layout and have programmable design parameters. In some embodiments, the APR tool can group and place unit cells into arrays, where each unit cell of an array can have similar functional or circuit designs. Each unit cell can also include at least one micro pad structure for electrically connecting the unit cell to other unit cells or to external circuitry. In some embodiments, the micro pad structures can include interconnect structures, such as conductive lines and vias. Adjacent unit cells can be connected by electrically connecting the respective micro pad structures of the adjacent unit cells.

A testing scheme for identifying faulty components, such as faulty metal conductive lines and/or vias of interconnect structures, can include a first probing process of sending testing signals through a series of unit cells of various arrays of unit cells and identifying an array of unit cells that contains a faulty unit cell. Further, a faulty unit cell of the series of unit cells is determined by analyzing the received signals and/or determined circuit parameters. A second probing process can include applying testing signals to the identified faulty unit cell and identifying faulty metal conductive lines and/or vias by analyzing the received signals and/or determined circuit parameters of the faulty unit cell. Benefits of implementing arrays of unit cells having micro pad structures can include improved efficiency of identifying faulty components of an IC structure, which in turn improves circuit fabrication yield.

In some embodiments, a method includes scanning a circuit layout and identifying layout regions of the circuit layout. The method further includes placing unit cells in a layout region of the layout regions and forming a micro pad structure at a border of a unit cell of the unit cells. The micro pad structure includes interconnect structures that are electrically connected to the unit cell.

In some embodiments, a method includes performing a first probing process on macro pad structures to identify an array of unit cells that contains a faulty unit cell, where each macro pad structure includes a single sheet of conductive material. The method also includes identifying the faulty unit cell from the array of unit cells. The method further includes performing a second probing process on micro pad structures of the faulty unit cell to identify a faulty conductive line or a faulty via of the faulty unit cell. Each micro pad structure includes an interconnect structure of a back-end-of-line (BEOL) semiconductor structure.

In some embodiments, a non-transitory computer-readable medium having instructions stored thereon that, when executed by a computing device, causes the computing device to perform operations including: (i) scanning a circuit layout; (ii) identifying layout regions of the circuit layout; (iii) placing unit cells in a layout region of the layout regions; and (iv) forming a micro pad structure at a border of a unit cell of the unit cells, where the micro pad structure includes interconnect structures that are electrically connected to the unit cell and formed in a back-end-of-line (BEOL) semiconductor structure.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   scanning a circuit layout;
   identifying a plurality of layout regions of the circuit layout, wherein each of the plurality of layout regions is electrically coupled to a plurality of macro pad structures;
   placing a plurality of unit cells in a layout region of the plurality of layout regions; and
   forming a micro pad structure at a border of a unit cell of the plurality of unit cells, wherein the micro pad structure comprises interconnect structures that are electrically connected to the unit cell.

2. The method of claim 1, wherein placing the plurality of unit cells comprises arranging the plurality of unit cells into an array.

3. The method of claim 1, wherein identifying the plurality of layout regions comprises selecting layout regions that satisfy a selection rule.

4. The method of claim 3, wherein the selection rule comprises selecting an area of a layout region that is greater than a threshold area.

5. The method of claim 3, wherein the selection rule comprises selecting an area of a layout region that performs a predetermined circuitry function.

6. The method of claim 3, wherein the selection rule comprises selecting an area of a layout region that has a probability of containing faulty unit cells that is greater than 1%.

7. The method of claim 1, wherein forming the micro pad structure comprises placing the micro pad structure at a distance away from an active region of the unit cell.

8. The method of claim 1, wherein forming the micro pad structure further comprises placing and routing conductive lines on different metallization layers of a back-end-of-line (BEOL) semiconductor structure.

9. The method of claim 1, further comprising forming an other micro pad structure at a border of an other unit cell, wherein:
the micro pad structure is between an active region of the unit cell and the other micro pad structure; and
the other micro pad structure is between an other active region of the other unit cell and the micro pad structure.

10. A method, comprising:
performing a first probing process on macro pad structures to identify an array of unit cells that contains a faulty unit cell, wherein each macro pad structure comprises a single sheet of conductive material;
identifying the faulty unit cell from the array of unit cells; and
performing a second probing process on micro pad structures of the faulty unit cell to identify a faulty conductive line or a faulty via of the faulty unit cell, wherein each micro pad structure comprises an interconnect structure of a back-end-of-line (BEOL) semiconductor structure.

11. The method of claim 10, wherein performing the first probing process comprises applying testing signals to the macro pad structures.

12. The method of claim 11, wherein the macro pad structures comprise an input terminal and an output terminal.

13. The method of claim 10, wherein the interconnect structure comprises conductive lines and vias.

14. The method of claim 10, wherein performing the second probing process comprises performing a scanning electron microscopy inspection on an active region of the faulty unit cell.

15. The method of claim 10, wherein identifying the faulty unit cell comprises comparing a location of the faulty unit cell to a chip-level map.

16. A non-transitory computer-readable medium having instructions stored thereon that, when executed by a computing device, causes the computing device to perform operations comprising:
scanning a circuit layout;
identifying a plurality of layout regions of the circuit layout, wherein each of the plurality of layout regions is electrically coupled to a plurality of macro pad structures;
placing a plurality of unit cells in a layout region of the plurality of layout regions; and
forming a micro pad structure at a border of a unit cell of the plurality of unit cells, wherein the micro pad structure comprises interconnect structures that are electrically connected to the unit cell and formed in a back-end-of-line (BEOL) semiconductor structure.

17. The non-transitory computer-readable medium of claim 16, wherein identifying the plurality of layout regions comprises selecting layout regions that satisfy a selection rule.

18. The non-transitory computer-readable medium of claim 16, wherein forming the micro pad structure comprises placing and routing conductive lines and vias of the interconnect structures.

19. The non-transitory computer-readable medium of claim 18, wherein the conductive lines are formed on different metallization layers of the back-end-of-line (BEOL) semiconductor structure.

20. The non-transitory computer-readable medium of claim 16, wherein the operations further comprise electrically connecting the unit cell to an other unit cell of the plurality of unit cells through the micro pad structure.

* * * * *